(12) United States Patent
Ting

(10) Patent No.: US 6,386,361 B1
(45) Date of Patent: May 14, 2002

(54) COMPACT DISC CASE

(76) Inventor: Chieh-I Ting, No. 2, Tsai Shing Road, Li Kang Hsiang, Pingtung Hsien (TW)

( * ) Notice: Subject to any disclaimer, the term of this patent is extended or adjusted under 35 U.S.C. 154(b) by 0 days.

(21) Appl. No.: 09/917,691

(22) Filed: Jul. 31, 2001

(51) Int. Cl.⁷ ............................................. B65D 85/57
(52) U.S. Cl. .................... 206/308.1; 206/310; 206/509
(58) Field of Search ............................. 206/308.1, 309, 206/310, 493, 503, 509, 511; 220/4.26, 4.27; 312/9.47, 9.48

(56) References Cited

U.S. PATENT DOCUMENTS

| | | | | |
|---|---|---|---|---|
| 5,469,961 A | * | 11/1995 | Chang | 206/509 |
| 5,575,387 A | * | 11/1996 | Gelardi | 206/308.1 |
| 5,704,474 A | * | 1/1998 | Oland | 206/308.1 |
| 5,746,314 A | * | 5/1998 | Knutsen et al. | 206/308.1 |
| 5,819,929 A | * | 10/1998 | Chung | 206/308.1 |
| 5,944,181 A | * | 8/1999 | Lau | 206/308.1 |
| 6,311,835 B1 | * | 11/2001 | Okuhara et al. | 206/308.1 |

* cited by examiner

Primary Examiner—Luan K. Bui
(74) Attorney, Agent, or Firm—Rosenberg, Klein & Lee

(57) ABSTRACT

A compact disc case includes an upper panel, a lower panel and a holding panel; the upper and the lower panels pivotally interconnect from rear ends, and have openings at fronts for the holding panel to be separably slided into between same. The upper panel and the lower panel have securing hooks and securing holes on lateral edges respectively such that the CD case can be securely positioned on top of a second case of the kind with the securing holes engaging the hooks of the second case for allowing a secured neat pile of cases to form. The holding panel is formed with several retaining protrusions arranged to form a circle in a spaced manner in the middle part so as to retain a CD by passing the retaining protrusions through the central hole of the CD; the connecting of the CD to the holding panel is loosened by depressing upper bent parts of the protrusions towards the center point of holding panel for removal of the CD. Several resilient sloping boards are interposed between the retaining protrusions to be helpful in removing the CD by the resilience biasing the CD upwards.

9 Claims, 4 Drawing Sheets

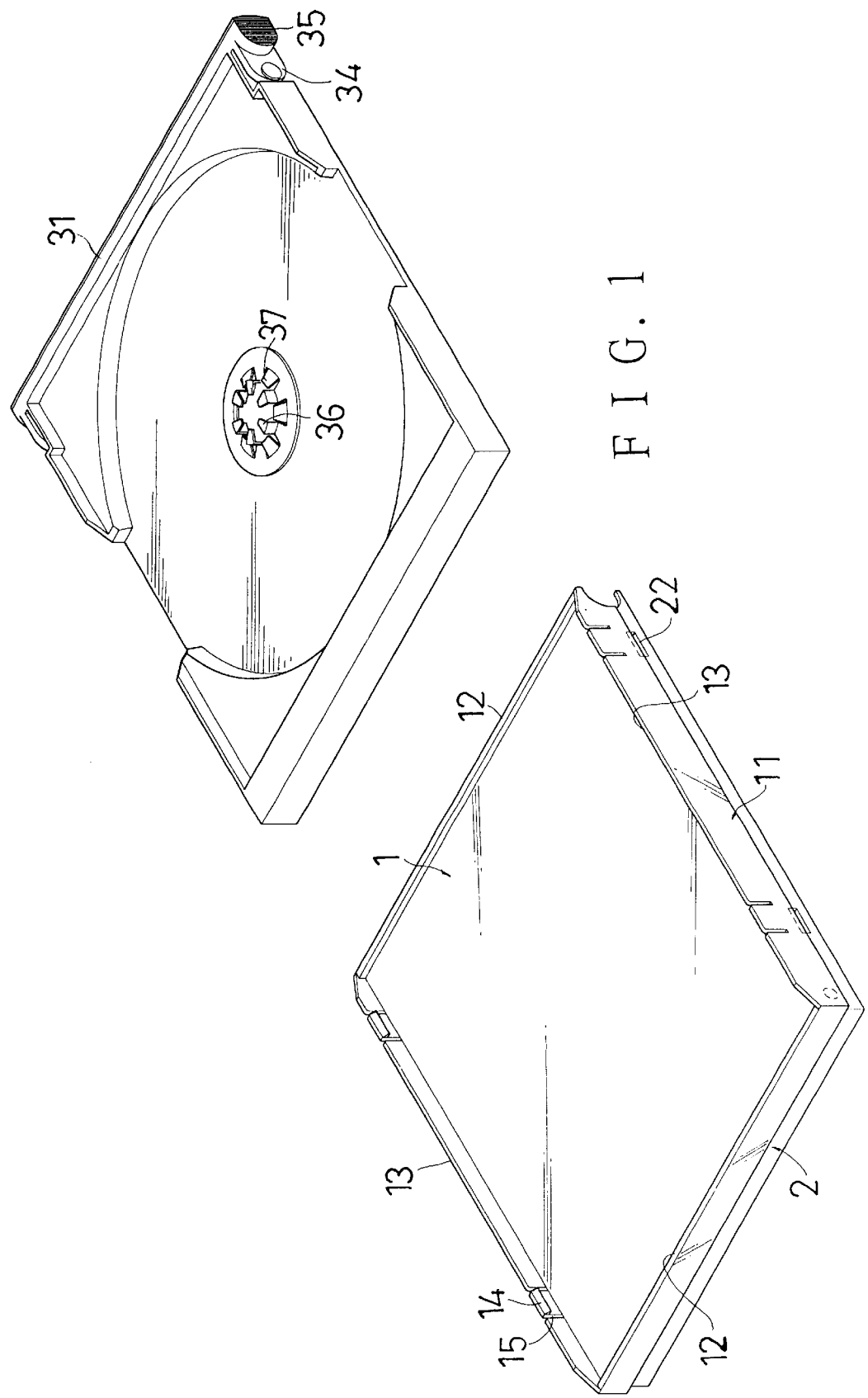
F I G. 1

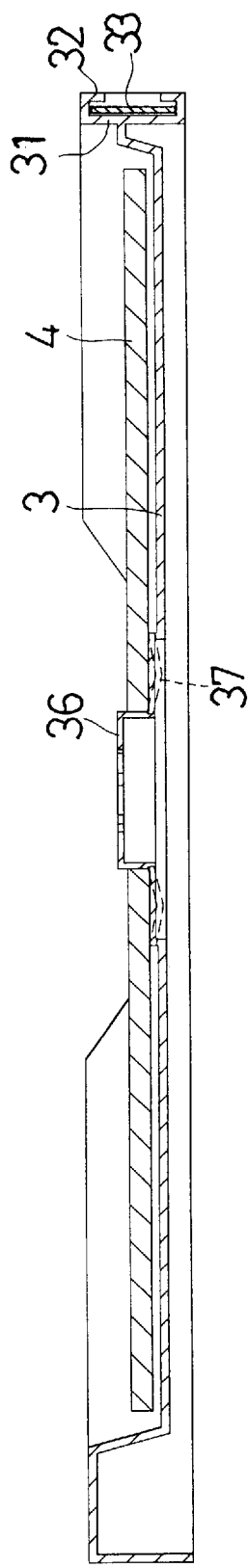
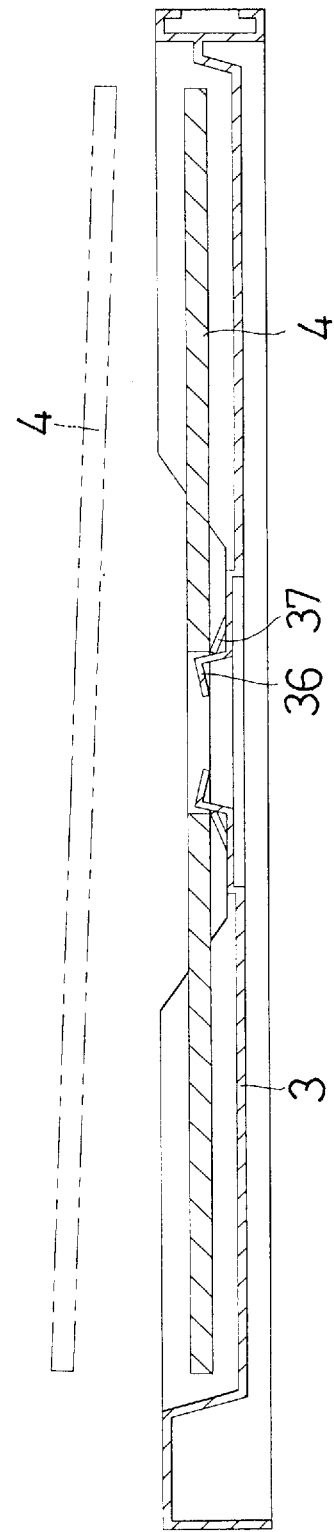
FIG. 6
FIG. 7

COMPACT DISC CASE

BACKGROUND OF THE INVENTION

The present invention relates to a compact disc case, and more particularly to a compact disc case which can be securely put on top of another case of the same kind for easy storage.

CD is made to have many forms such as DVD, VCD, CD-ROM discs, and are usually stored in a flat plastic case. The CD storing case usually consists of an upper cover panel, and a lower cover panel which pivotally interconnect for allowing the case to easily open and close. The lower cover panel is formed with spaced engaging protrusions around a central hole thereof; the engaging protrusions stick upright, and are each folded at an angle of 90° inwardly of the central hole at an upper portion thereof such that the CD can be retained in the lower cover panel by means of passing the engaging protrusions through the central hole of the CD; the CD can be easily removed by means of depressing the tops of the engaging protrusions to loosen the connection of the engaging protrusions to the CD.

However, it is found that the CD storing case has the following drawbacks. Firstly, CD storing cases of the above mentioned kind are not provided with securing means for securing one to another. Consequently, the user has to buy additional racks in order to put the CD cases in a proper position for easy storage. And, it will cost the user considerable money to buy the additional racks when he or she has a lot of CD cases.

Secondly, the user has to depress the tops of the engaging protrusions with one of his index fingers, and lift the edges of the CD with one of his thumbs and middle fingers in order to remove the CD from the lower cover panel, so the way of removing is not very convenient. Moreover, the CD can't be easily removed when the engaging protrusions and the central hole of the CD too tightly.

SUMMARY OF THE INVENTION

Therefore, it is a main object of the present invention to provide a CD case which can be securely positioned on top of another case of the kind for easily storage.

It is another object of the present invention to provide a CD case which has a CD holding panel slidable into and out of the space defined by the upper and the lower cover panels for allowing the CD to be taken out without having to open the cover panels.

The CD case of the present invention includes an upper cover panel, a lower cover panel and a holding panel. The upper and the lower panels pivotally interconnect at rear ends, and have openings at fronts for the holding panel to be separably slided into between same.

The upper panel further has securing hooks on the lateral edges, while the lower panel has securing holes below a respective one of the securing hooks; thus, the CD case can be securely positioned on top of a second case of the kind with the securing holes engaging the hooks of the second case for allowing a secured neat pile of cases to form without using additional racks.

The folding panel is formed with several retaining protrusions arranged to form a circle in a spaced manner in the middle thereof so as to retain the CD by passing the retaining protrusions through the central hole of the CD. By depressing upper folded parts of the protrusions inwardly of the CD central hole, the connection of the CD to the holding panel can be loosened for easy removal of the CD. The holding panel further has resilient sloping boards interposed between the retaining protrusions to help the CD to be removed with the resilience of the sloping boards.

In addition, the holding panel has connecting parts on front ends of lateral sides, which can snap onto recessed parts on the inner side of the lower panel to secure the holding panel in position when the holding panel is inserted into between the upper and the lower panel. The connecting parts are pressed inwardly of the holding panel to disengage the recessed parts so as to allow the holding panel to be pulled out for removal of the CD for use.

BRIEF DESCRIPTION OF THE DRAWINGS

This invention will be better understood by referring to the accompanying drawings, wherein:

FIG. 1 is an exploded perspective view of the CD case according to the present invention.

FIG. 6 is a view of a CD being held on the holding panel and retained by the retaining protrusions according to the present invention.

FIG. 7 is a view illustrating the movements in removing the CD from the holding panel of the present invention.

DETAILED DESCRIPTION OF THE PREFERRED EMBODIMENT

Figure 2:
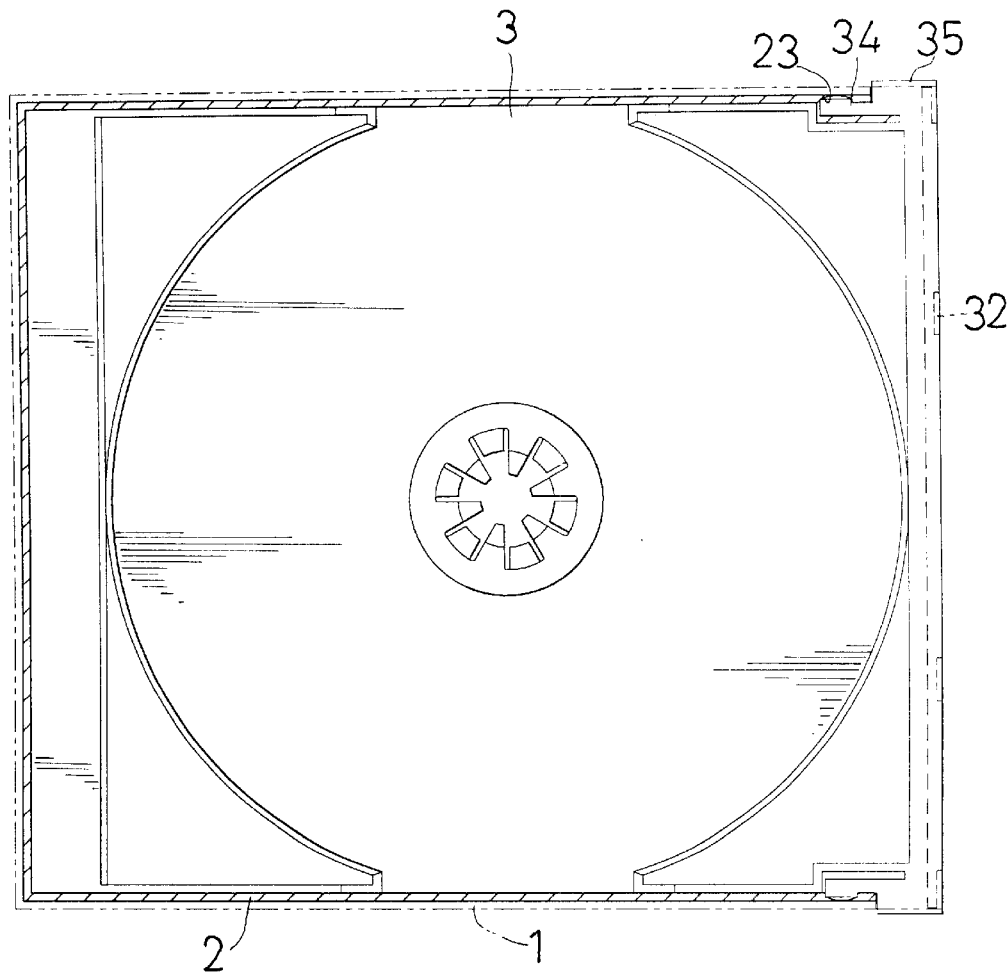
FIG. 2 is a top view of the CD case of the present invention in the opened position.
Figure 3:
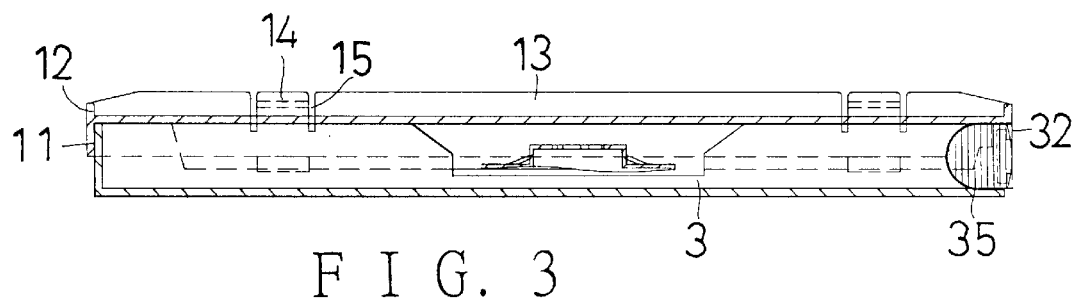
FIG. 3 is a side view of the CD case of the present invention.
Figure 4:
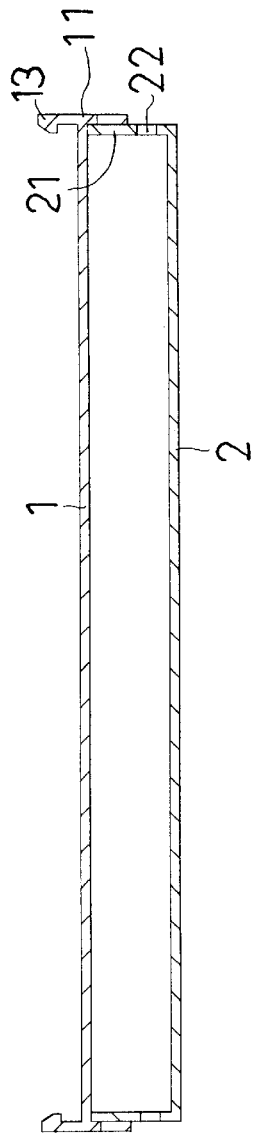
FIG. 4 is a cross-sectional view of the upper and the lower cover panels in combination according to the present invention.
Figure 5:
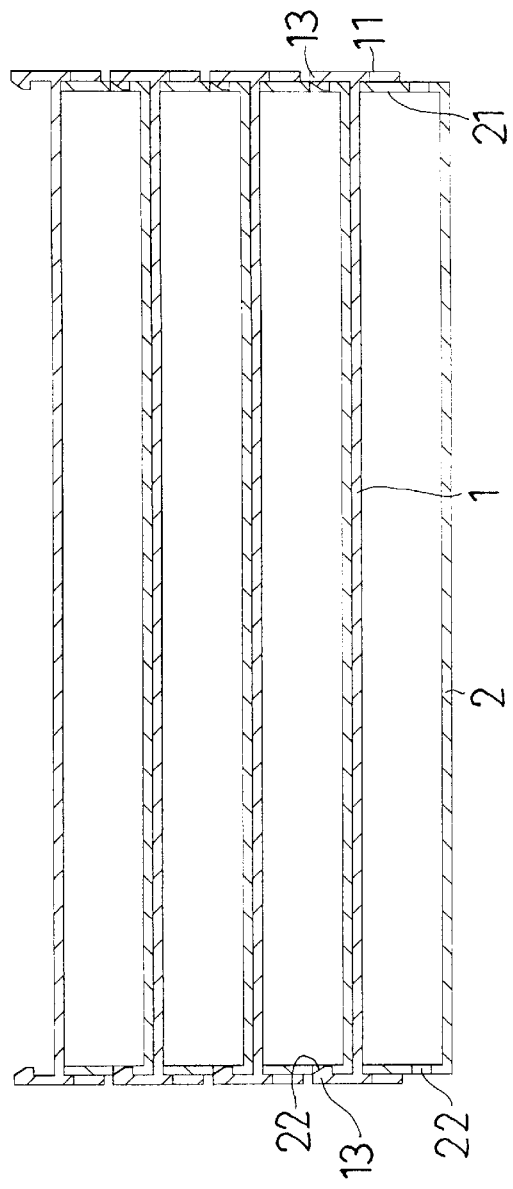
FIG. 5 is a cross-sectional view of the upper and lower cover panels in combination in secured stacked-up manner according to the present invention.

Referring to FIGS. 1 to 4, the CD case of the present invention includes a main body consisting of both an upper cover panel 1 and a lower cover panel 2, and a holding panel 3. The rear end of the upper cover panel 1 is pivoted to the rear end of the lower cover panel 2 so that the main body of CD case can open and close. The holding panel 3 can be slided into between the upper and the lower cover panels 1 and 2 from an opening (not numbered) of the front end of the main body.

Furthermore, the upper cover panel 1 has a surrounding vertical edge 11, a front and a rear walls 12 and 12 and two opposing lateral walls 13; the walls 12, 12, 13 and 13 stick upright from the vertical edge 11; the walls 13 and 13 are formed with a height larger than the walls 12 and 12. The upper cover panel 1 is formed with securing hooks 14 on the lateral sides, and gaps 15 which are interposed between each of the securing hooks 14 and the lateral walls 13 for allowing the hooks 14 to be flexible.

The lower cover panel 2 is formed with a surrounding vertical wall 21 and securing holes 22 on the lateral sides corresponding to the securing hooks 14 of the upper cover panel 1. Thus, several CD cases of the kind can be stacked up in a stable manner with the securing hooks 14 of each of the CD cases engaging the securing holes 22 of the adjacent upper CD case. The lower cover panel 2 further has two opposing slightly recessed cavities 23 on the inner sides of the front ends of the lateral parts of the vertical walls 21 thereof.

The holding panel 3 is formed with a front edge 31, several claw-shaped retaining parts 32 (FIG. 6) on the front edge 31, a catalogue slip 33 retained on the front edge 31 by the claw-shaped retaining parts 32, a pair of pressed parts 35 formed on front ends of the lateral sides, and two connecting parts 34, which each is connected to a respective one of the pressed parts 35, and formed with a slightly convex part (not numbered) facing out. The holding panel 3 further has several retaining protrusions 36, which stick up and are arranged to form a circle in a spaced-out manner in the middle thereof; the retaining protrusions 36 are flexible, and the upper part of each of the same 36 is folded at an angle of about 90° towards the center point of the holding panel 3 such that a CD 4 can be retained in the panel 3 by means of passing the retaining protrusions 36 through the central hole of the CD 4, and can be removed by means of depressing the folded upper ends of the retaining protrusions 36 to loosen the connecting of the same to the retaining protrusions 36. Resilient sloping boards 37 are formed on the folding panel 3, each being interposed between two of the retaining protrusions 36 to be helpful in removing the CD 4 retained by the retaining protrusions 36 with the resilience which will bias the CD 4 upwards when the upper folded ends of the retaining protrusions 36 are depressed, as shown in FIGS. 6 and 7.

To position the holding panel 3 between the upper and the lower cover panels 1 and 2 stably, the same is slided onto the space between the panels 1 and 2 for the convex parts of the connecting parts 34 to snap onto the slightly recessed cavities 23 of the lower cover panel 2. To remove the CD 4 from the holding panel 3, the user can first pivot the upper cover panel 1 on the lower one 2 to open the main body or slide the holding panel 3 out of the main body; the user should press the pressed parts 35 of the holding panel 3 inwardly of the panel 3 to disengage the connecting parts 34 from the cavities 23 of the lower panel 2 for allowing the panel 3 to be easily taken out.

From the above description, it can be understood that the CD case the present invention has the following desirable features.

1. Several CD cases of the present invention can be stacked up in a stable manner with the securing hooks of each of CD cases engaging the securing holes of the adjacent upper one of the CD cases. Thus, the CD cases can be arranged to become a neat pile in which each of the CD cases is secured in position without having to use additional racks. In other words, the CD cases of the present invention can save the user's money spent in additional racks.
2. The user can easily find out the CD case which holds the CD he is looking for with the help of the catalogue slip retained on the front edge of the holding panel by the claw-shaped retaining parts.
3. The holding panel can be easily taken out from the main body by means of pressing the pressed parts of the holding panel to disengage the convex surfaces of the connecting parts from the cavities of the lower panel.
4. The resilient sloping boards of the holding panel is helpful in removing the CD retained by the retaining protrusions with resilience, which can bias the CD up when the upper folded ends of the retaining protrusions are depressed. So, the CD can be removed for use relatively easily.
5. Besides pulling the holding panel out of the main body, the user can also pivot the upper cover panel on the lower one to open the main body so as to allow the holding panel to show for removal of the CD held on the holding panel.

What is claimed is:
1. A CD case, comprising a main body;

a holding panel separably inserted into said main body; and characterized by a plurality of securing hooks stick upright from two lateral edges of said main body;

a plurality of securing holes each formed on said lateral edges of said main body below a corresponding one of said securing hooks;

a plurality of retaining protrusions sticking up and being arranged to form a circle in a space-out manner in a middle part of said holding panel; said retaining protrusions being flexible and each folded at an upper part towards a center point of said holding panel;

a plurality of resilient sloping boards formed on said holding panel, each interposed between two adjacent ones of said retaining protrusions so as to help a CD having a central hole mounted on, and retained by, said retaining protrusions to be removed from said holding panel by resilience thereof which biases said CD up;

said CD case being capable of being securely positioned on top of another CD of said kind with said recurring holes thereof being connected to securing hooks of said another CD.

2. The CD case as claimed in claim 1, wherein said main body consists of a lower cover panel and an upper panel pivoted to a rear end of said lower cover panel from a rear end thereof; said securing hooks being formed on said upper panel; said securing holes being formed on said lower panel.

3. The CD case as claimed in claim 1, wherein said main body is formed with walls on said lateral edges and said securing hooks are formed next to said walls with gaps being formed between same and said walls.

4. The CD case as claimed in claim 1, wherein said upper cover panel is formed with walls on said lateral edges and on a front and a rear edge thereof; said securing hooks being formed next to said walls on said lateral edges.

5. The CD case as claimed in claim 4, wherein, said upper cover panel is formed with gaps interposed between said securing hooks and said walls on said lateral edges for said securing hooks to be flexible.

6. The CD case as claimed in claim 1, wherein said holding panel is provided with a front edge having a catalogue slip secured thereto.

7. The CD case as claimed in claim 6, wherein said front edge of said holding panel is formed with a plurality of claw-shaped retaining parts so as to retain said catalogue slip in position.

8. The CD case as claimed in claim 1, 6 or 7, wherein said main body has two opposing recessed cavities on inner sides of front ends of said lateral edges thereof; and, said holding panel has two pressed parts and two connecting parts each connected to a respective one of said pressed parts and formed with a facing-out convex part; said holding panel being secured in said main body with said convex parts snapping onto said recessed cavities and being separable from said main body by means of pressing said pressed parts inwardly of said holding panel so as to disengage said convex parts from said recessed cavities.

9. The CD case as claimed in claim 1, wherein said holding panel being pulled out of the main body.

* * * * *